Sept. 1, 1964 R. H. BRONLEEWE 3,147,027
TOW HITCH
Filed May 16, 1962 2 Sheets-Sheet 1

Robert H. Bronleewe
INVENTOR.

BY
Attorneys

Sept. 1, 1964  R. H. BRONLEEWE  3,147,027
TOW HITCH
Filed May 16, 1962  2 Sheets-Sheet 2
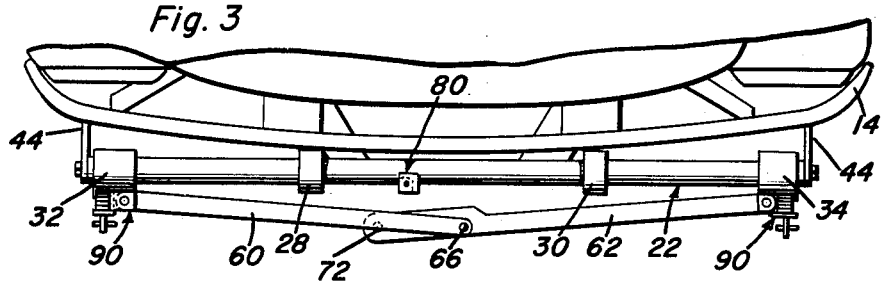
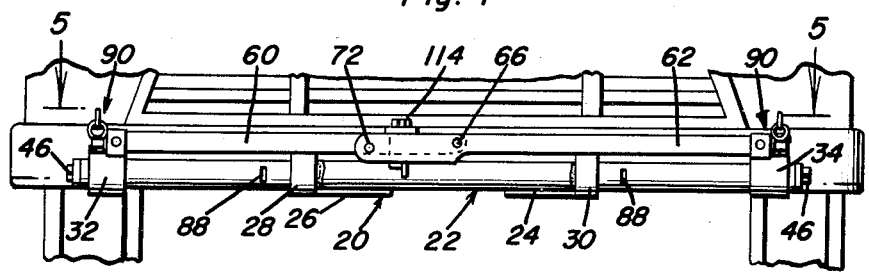
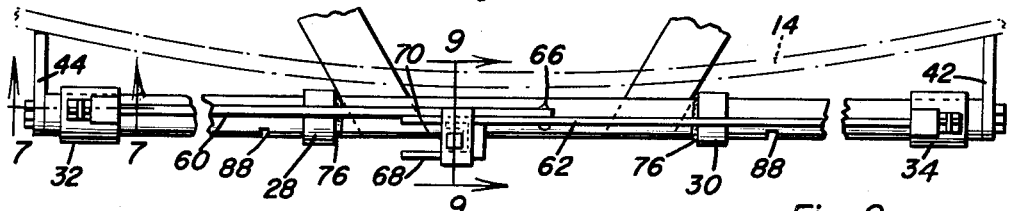
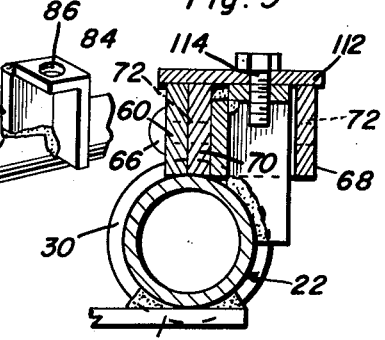
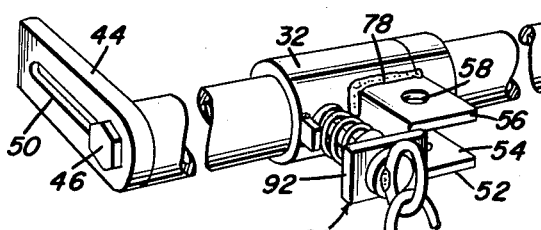
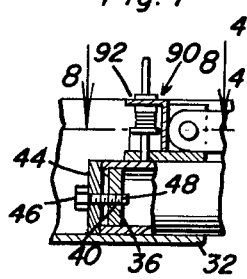
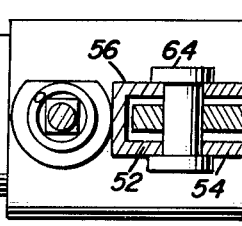
Robert H. Bronleewe
INVENTOR.
BY
Attorneys

United States Patent Office 3,147,027
Patented Sept. 1, 1964

3,147,027
TOW HITCH
Robert H. Bronleewe, R.R. 2, Geneseo, Kans.
Filed May 16, 1962, Ser. No. 195,091
10 Claims. (Cl. 280—491)

This invention relates to a novel and useful collapsible towing hitch for vehicles which may be utilized on the forward end of a vehicle for enabling that vehicle to be towed behind a towing vehicle.

The collapsible tow hitch of the instant invention is constructed in a manner whereby it may be readily secured to the front portion of a vehicle to be towed outwardly of the front bumper of that vehicle and the collapsible towing hitch includes a pair of towing arms having one set of ends slidingly mounted from an elongated mounting bar portion of the tow hitch which extends transversely of the vehicle to which the tow hitch is secured for sliding movement longitudinally of the mounting bar. The one set of ends of the towing arms are also pivotally secured to the mounting bar for rotational movement about the longitudinal axis of the mounting bar while the other pair of corresponding ends of the towing arms are pivotally secured together and adapted for securement to the towing vehicle.

The main object of this invention is to provide a collapsible towing hitch for motor vehicles which may be semi-permanently secured to a vehicle and moved into and out of an extended operational position with little effort.

Another important object of this invention is to provide a collapsible, towing hitch which, when secured to the vehicle to be towed, may be readily attached to the towing vehicle, if the latter is adjacent the towed vehicle, without having to jockey one vehicle relative to the other.

Still another important object of this invention is to provide a tow hitch in accordance with the preceding objects, which will automatically lock the tow hitch in a correct position, relative to the towing and towed vehicles, with the towed vehicle positioned to track behind the towing vehicle.

A further object of this invention, in accordance with the immediately preceding object, is to provide a collapsible towing hitch which may be readily secured in the retracted inoperative position.

Another object of this invention is to provide a collapsible towing hitch which is readily adapted for securement to various types and sizes of vehicles.

A still further object of this invention is to provide a collapsible towing hitch which may be utilized to provide a connection between a towing vehicle and a vehicle which is to be towed that will enable the vehicle being towed to be unattended for the purpose of steering that vehicle.

A final object to be specifically enumerated herein is to provide a collapsible towing hitch in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a top plan view of the forward end of the vehicle which is to be towed and which has the collapsible towing hitch of the instant invention secured thereto, the collapsible towing hitch being shown in a partially collapsed state;

FIGURE 4 is a front elevational view of the embodiment illustrated in FIGURE 3;

FIGURE 5 is a fragmentary top plan view of the collapsible towing hitch shown in the fully collapsed position, the bumper with which the towing hitch is engaged being shown in phantom lines;

FIGURE 6 is a fragmentary enlarged perspective view of one end of the towing hitch;

FIGURE 7 is an enlarged fragmentary vertical sectional view taken substantially upon the plane indicated by the section line 7—7 of FIGURE 5;

FIGURE 8 is an enlarged fragmentary vertical sectional view taken substantially upon the plane indicated by the section line 8—8 of FIGURE 7;

FIGURE 9 is an enlarged vertical sectional view taken substantially upon the plane indicated by the section line 9—9 of FIGURE 5.

Figure 1:
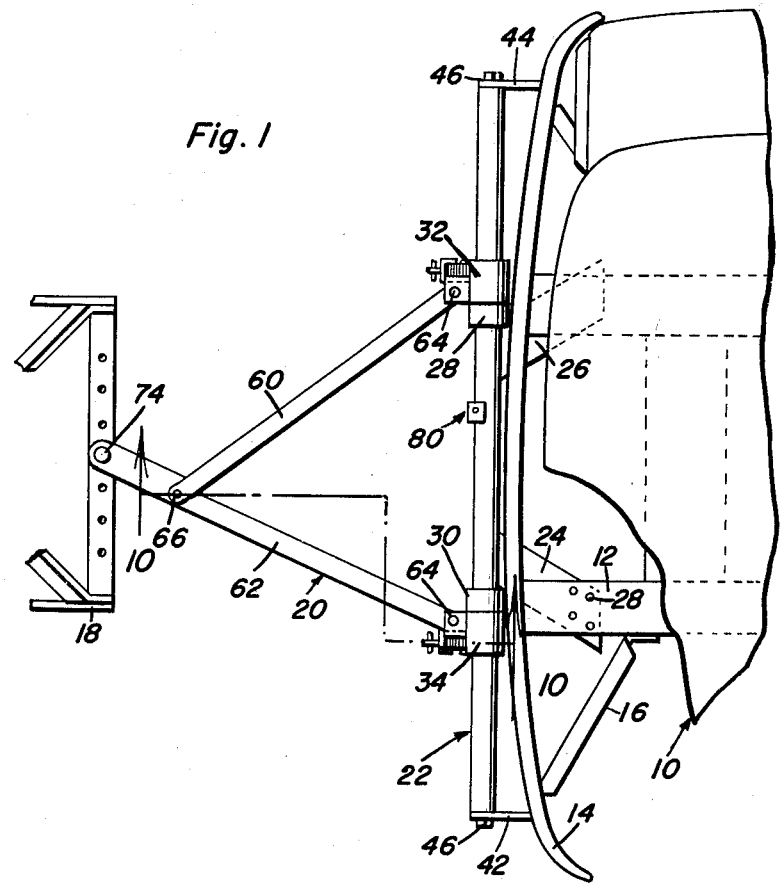
FIGURE 1 is a top plan view of the collapsible towing hitch of the instant invention shown in position secured to the forward portion of a vehicle which is to be towed and attached to a hitch of a towing vehicle, portions of the vehicle being towed being broken away.

Referring now more specifically to the drawings the numeral 10 generally designates a vehicle which is to be towed and which includes a main frame 12 and a bumper 14 having bumper supports 16. A towing hitch 18 is secured to the rear end of a towing vehicle (not shown) and the tow hitch of the instant invention is generally referred to by the reference numeral 20.

The tow hitch 20 includes an elongated mounting bar generally referred to by the reference numeral 22 to which there is secured a pair of rearwardly divergent arms 24 and 26 which are secured at their free ends to the main frame 12 in any convenient manner such as by fasteners 28. In addition, it will be noted that the bumper 14 is secured to the forward end of the frame 12 and that the elongated mounting bar 22 is disposed forwardly of the bumper 14. However, if it is desired, the mounting bar 22 may be positioned either above, below or behind the forwardmost point of the bumper 14 as desired.

A pair of abutment sleeves 28 and 30 are secured to the elongated mounting bar 22 and a pair of slide brackets 32 and 34 are slidingly disposed on the opposite end portions of the mounting bar 22 outwardly of the abutment sleeves 28 and 30.

From FIGURES 1 and 7 of the drawings it may be seen that an end wall 36 is secured in each end of the mounting bar 22 and that each end wall 36 is provided with a threaded bore 40. A pair of laterally directed arms 42 and 44 are secured to the opposite ends of the mounting bar 22 by means of fasteners 46 which have threaded shank portions 48 threadedly engaged in the corresponding bores 40 and slidingly received in the longitudinal slots 50 formed in the arms 42 and 44.

Figure 2:
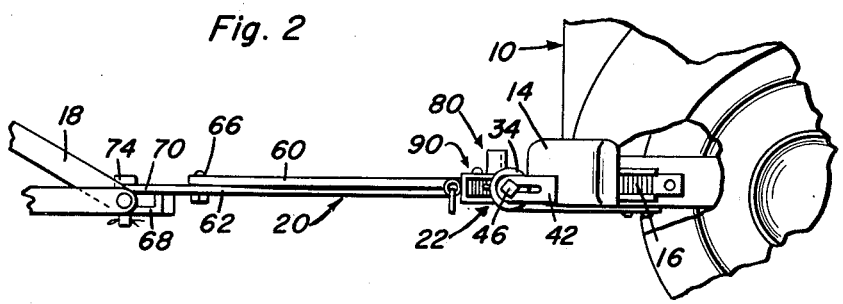
FIGURE 2 is a side elevational view of the embodiment illustrated in FIGURE 1 of the drawings and with portions of the towed and towing vehicles being broken away.

Each of the slide brackets 32 and 34 is provided with a bifurcated mount 52 whose furcations 54 and 56 are apertured as at 58 and one pair of corresponding ends of a pair of towing arms 60 and 62 are pivotally secured between the corresponding furcations 54 and 56 by means of suitable pivot pins 64. The other pair of corresponding ends of the towing arms 60 and 62 are pivotally secured together by means of a pivot pin 66 and it will be noted that the end of the arm 62 remote from the corresponding slide bracket 34 is bifurcated and includes a pair of apertured furcations 68 and 70 which are each apertured as at 72 for the reception of a pivot pin 74 to secure the arm 62 to the tow hitch 18, see FIGURES 1 and 2.

As can best be seen from FIGURE 5 of the drawings the abutment sleeves 28 and 30 are secured to the mounting bar 22 by means of welding 76 and it may be seen from FIGURE 6 of the drawings that each of the bifurcated mounts 52 is secured to the corresponding slide bracket by means of suitable welding 78. In addition, a retaining bracket generally referred to by the reference numeral 80 is fixedly secured to a mid-portion of the mounting bar 22 in any convenient manner such as by welding 82 and the retaining bracket 80 includes a horizontally disposed flange portion 84 having a vertical threaded bore 86 formed therethrough.

Figure 10:
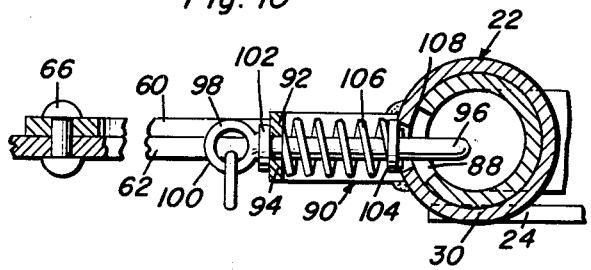
FIGURE 10 is an enlarged fragmentary vertical sectional view taken substantially upon the plane indicated by the section line 10—10 of FIGURE 1.

As can best be seen from FIGURES 4, 5 and 10 of the drawings the forward face of the support or mounting bar or sleeve 22 is provided with a pair of circumferentially extending slots 88 and that each of the slide brackets 32 and 34 is provided with a detent assembly generally referred to by the reference numeral 90.

Each detent assembly 90 includes an apertured mounting lug 92 which is apertured as at 94 and slidingly receives therethrough the shank portion 96 of a retaining pin 98 on whose head portion 100 there is formed a circular collar 102 for abutting engagement with the outer surface of the mounting lug 92.

Each shank portion 96 is provided with a second collar 104 and a compression spring 106 is disposed between the confronting surfaces of corresponding collars 104 and mounting lugs 92. Accordingly, the shank portions 96 are resiliently urged toward a position with their ends remote from the head portions 100 projecting through the corresponding opening 108 formed in the associated side bracket and into the corresponding slot 88 when the towing hitch 20 is in its extended position illustrated in FIGURES 1 and 2.

In operation, the mounting bar 22 is secured to the frame 12 as previously set forth and arms 42, 44 are adjusted so that their free ends abut against the forward face of the bumper 14 in order to provide support for the opposite end portions of the mounting bar 22. Then, with the towing arms 60 and 62 positioned as shown in FIGURE 1 of the drawings, the shank portions 96 may be engaged with their respective slots 88 and the pivot pin or fastener 74 may be utilized to secure the free end of the arm 62 to the towing hitch 18. In this manner, the vehicle to which the towing hitch 18 is secured may readily tow the vehicle 10.

When it is desired to move the towing hitch 20 to a retracted inoperative position, the head portions 100 of the retaining pins 98 may be pulled outwardly in order to retract the shank portions 96 from their respective slots 88. Then, the slide brackets 32 and 34 will be free to slide longitudinally of the mounting bar 22 away from each other toward the positions illustrated in FIGURES 3 through 5 of the drawings. After the arms 60 and 62 have been moved to their almost fully retracted positions, the slide brackets 32 and 34 may be pivoted about the longitudinal axis of the mounting bar 22 in order to position the arms 60 and 62 above the mounting bar 22 as shown in FIGURE 4 of the drawings.

After the arms 60 and 62 have been pivoted to their positions above the mounting bar 22, the bifurcated end of the arm 62 may have its furcations 68 and 70 disposed on opposite sides of the retaining bracket 80. Then, an apertured retaining plate 112 and a fastener 114 may be utilized to secure the arms 60 and 62 in their retracted positions upon the securement of the plate 112 over the upper surfaces of the flange 84 and the furcations 68 and 70.

It will be noted that the slots 88 extend about the tubular mounting bar 22 a distance sufficient to enable the arms 60 and 62 to be swung between slightly downwardly inclined positions and slightly upwardly inclined positions with the ends of the slots 88 preventing greater oscillatory movement of the arms 60 and 62. In this manner, even if the free end of the arm 62 is not secured to the tow hitch 18, the forward end of the arm 62 will not drop down upon the surface upon which the vehicle 10 is resting.

The abutment sleeves 28 and 30 limit sliding movement of the slide brackets 32 and 34 toward each other as does the engagement of the shank portions 96 within the slots 88.

Inasmuch as the arms 42 and 44 are provided with the longitudinal slots 50, the mounting bar 22 may have its opposite end portions braced from the opposite ends of the bumper 14 even though the bumper 14 might be provided with more or less curvature.

When securing the free end of the arm 62 to the towing hitch 18, the tow hitch is first moved from its fully retracted position toward a partially extended position. Before the slide brackets 32 and 34 have been moved into position abutting the sleeves 28 and 30 and the retaining pins 98 have been seated in slots 88, the free end of arm 62 may be moved through positions within the limits established by the sleeves 28 and 30. Accordingly the vehicle 10 is positioned closely adjacent the hitch 18 whereupon the free end of arm 62 may be easily moved into position for proper pivotal connection with the hitch 18. Then, as the hitch moves forward relative to vehicle 10, the extension of the hitch 18 will move the slide brackets 32 and 34 into engagement with the abutment sleeves 28 and 30. At this time, the pins 98 of the detent assemblies will engage the slots 88 and thereby lock the arms 60 and 62 in extended positions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A collapsible towing hitch for vehicles comprising an elongated mounting bar, means carried by and adapted to support said mounting bar on a vehicle at one end thereof with said bar generally horizontally disposed and extending transversely of said vehicle, a pair of slide brackets slidably and rotatably mounted on opposite ends of said bar for movement longitudinally thereof and about the longitudinal axis of said bar, a pair of towing arms each pivotally secured at one end to the corresponding bracket for movement about an axis extending transversely of said bar, means pivotally securing the other ends of said arms together for movement about an axis paralleling the axes of rotation of said one ends of said arms relative to said slide brackets, said bar and slide brackets including coacting means defining limit positions of movement of said brackets toward each other to positions with said arms diverging away from each other and spaced an appreciable distance apart at their other ends, said bar being of a length enabling said brackets to be shifted axially of said bar away from each other a distance sufficient to swing the other ends of said arms to a position closely adjacent said bar and said arms in substantial parallel relation with said bar in retracted positions.

2. The combination of claim 1 wherein said bar and slide brackets also include other coacting means limiting rotational movement of said slide brackets relative to said mounting bar.

3. The combination of claim 2 wherein said other coacting means includes means limiting rotational movement of said brackets relative to said mounting bar between positions with said other ends of said arms, when extended, slightly downwardly inclined and slightly upwardly inclined.

4. The combination of claim 3 wherein said other coacting means also defines means releasably preventing movement of said brackets away from said limit positions in directions away from each other.

5. The combination of claim 1 wherein said brackets, when said arms are in the retracted position may be pivoted relative to said bar so as to position said arms in a storage position above and generally paralleling said bar, said bar and at least one of said arms including coacting means for releasably retaining said arms in the storage position.

6. The combination of claim 1 wherein said means adapted to support said bar from a vehicle includes brace means on opposite sides of the longitudinal center point of said bar for mounting said bar with said center point disposed a spaced distance outwardly of the adjacent bumper of said vehicle.

7. The combination of claim 6 wherein said brace means are spaced inwardly from the opposite ends of said bar, and additional brace means carried by the opposite ends of said bar adapted for engagement with corresponding end portions of said bumper.

8. The combination of claim 7 wherein said additional brace means includes a pair of arm members projecting laterally of said bar, means mounting said arm members on said bar for adjustable extension and retraction of the free ends of said arm members laterally of said bar, the free ends of said arm members being adapted for abutting engagement with the corresponding end portions of said bumper.

9. The combination of claim 2 wherein said other coacting means also defines means releasably preventing movement of said brackets away from said limit positions in directions away from each other.

10. The combination of claim 9 wherein said brackets, when said arms are in the retracted position may be pivoted relative to said bar so as to position said arms in a storage position above and generally paralleling said bar, said bar and at least one of said arms including coacting means for releasably retaining said arms in the storage position.

References Cited in the file of this patent
UNITED STATES PATENTS

| | | |
|---|---|---|
| 2,600,959 | Bender | June 17, 1952 |
| 2,995,386 | Peterson | Aug. 8, 1961 |
| 3,004,774 | Lokka | Oct. 17, 1961 |